US007138058B2

(12) United States Patent
Kurth et al.

(10) Patent No.: US 7,138,058 B2
(45) Date of Patent: Nov. 21, 2006

(54) ACID STABLE MEMBRANES FOR NANOFILTRATION

(75) Inventors: Christopher J. Kurth, St. Louis Park, MN (US); Steven D. Kloos, Chanhassen, MN (US); Jessica A. Peschl, Minneapolis, MN (US); Leonard T. Hodgins, Closter, NJ (US)

(73) Assignee: GE Osmonics, Inc., Minnetonka, MN (US)

( * ) Notice: Subject to any disclaimer, the term of this patent is extended or adjusted under 35 U.S.C. 154(b) by 138 days.

(21) Appl. No.: 10/302,721

(22) Filed: Nov. 22, 2002

(65) Prior Publication Data

US 2003/0121857 A1    Jul. 3, 2003

Related U.S. Application Data

(63) Continuation of application No. PCT/US01/16901, filed on May 23, 2001.

(60) Provisional application No. 60/206,276, filed on May 23, 2000, provisional application No. 60/206,494, filed on May 23, 2000.

(51) Int. Cl.
  *B01D 39/14* (2006.01)
  *B01D 29/00* (2006.01)
  *B01D 61/00* (2006.01)
  *B01D 61/02* (2006.01)
  *C02F 1/44* (2006.01)

(52) U.S. Cl. .................. 210/500.38; 210/500.41; 210/483; 210/488; 210/490; 210/651; 210/652; 210/653; 210/654

(58) Field of Classification Search ........... 210/483, 210/488, 490, 500.38, 500.41, 651, 652, 210/653, 654
See application file for complete search history.

(56) References Cited

U.S. PATENT DOCUMENTS

| 856,310 | A | 6/1907 | Stone |
| 873,606 | A | 12/1907 | Rhoades |
| 875,067 | A | 12/1907 | Green |
| 875,070 | A | 12/1907 | Haas et al. |
| 875,072 | A | 12/1907 | Harbach |
| 2,808,394 | A | 10/1957 | Speck ................ 260/79.3 |
| 2,853,475 | A | 9/1958 | Murphey ............. 260/79.3 |
| 2,875,183 | A | 2/1959 | Murphey ............. 260/79.3 |
| 3,744,642 | A | 7/1973 | Scala et al. |
| 3,914,358 | A | 10/1975 | Dixon et al. ............ 264/41 |
| 3,951,815 | A | 4/1976 | Wrasidlo ............ 210/500 M |
| 3,988,883 | A | 11/1976 | Sze .................... 57/245 |
| 4,039,440 | A | 8/1977 | Cadotte ............. 210/23 H |
| 4,080,483 | A | 3/1978 | Kray .................. 428/290 |
| 4,107,155 | A | 8/1978 | Fletcher et al. .......... 528/373 |
| 4,242,208 | A | 12/1980 | Kawaguchi et al. ...... 210/500.2 |
| 4,251,387 | A | 2/1981 | Lim et al. ............ 252/316 |
| 4,265,745 | A | 5/1981 | Kawaguchi et al. ...... 210/654 |
| 4,277,344 | A | 7/1981 | Cadotte ............. 210/654 |
| 4,302,336 | A | 11/1981 | Kawaguchi et al. ...... 210/654 |
| 4,360,434 | A | 11/1982 | Kawaguchi et al. ...... 210/500.2 |
| 4,388,189 | A | 6/1983 | Kawaguchi et al. ...... 210/490 |
| 4,619,767 | A | 10/1986 | Kamiyama et al. ...... 210/490 |
| 4,758,343 | A | 7/1988 | Sasaki et al. .......... 210/500.38 |
| 4,761,234 | A | 8/1988 | Uemura et al. ........ 210/500.38 |
| 4,765,897 | A | 8/1988 | Cadotte et al. ....... 210/500.23 |
| 4,857,363 | A | 8/1989 | Sasaki et al. ............ 427/245 |
| 4,872,984 | A | 10/1989 | Tomaschke ........... 210/500.38 |
| 4,948,507 | A | 8/1990 | Tomaschke ........... 210/500.38 |
| 4,950,404 | A | 8/1990 | Chau .................... 210/500.27 |
| 4,983,291 | A | 1/1991 | Chau et al. ............ 210/490 |
| 5,051,178 | A | 9/1991 | Uemura et al. ........ 210/500.38 |
| 5,085,777 | A | 2/1992 | Arthur ................. 210/500.38 |
| 5,234,598 | A | 8/1993 | Tran et al. ............. 210/654 |
| 5,258,203 | A | 11/1993 | Arthur ................. 427/245 |
| 5,262,054 | A | 11/1993 | Wheeler ............... 210/639 |
| 5,271,843 | A | 12/1993 | Chau et al. ............ 210/654 |
| 5,358,745 | A | 10/1994 | Tran et al. ............. 427/333 |
| 5,547,579 | A * | 8/1996 | Brown ................. 210/651 |
| 5,576,057 | A | 11/1996 | Hirose et al. ........... 427/245 |
| 5,614,099 | A | 3/1997 | Hirose et al. ........... 210/653 |
| 5,627,217 | A | 5/1997 | Rilling et al. ........... 521/50 |
| 5,658,460 | A | 8/1997 | Cadotte et al. ........ 210/500.38 |
| 5,674,398 | A | 10/1997 | Hirose et al. .......... 210/500.38 |
| 5,693,227 | A | 12/1997 | Costa .................. 210/650 |
| 5,733,602 | A | 3/1998 | Hirose et al. ........... 427/245 |
| 5,744,039 | A | 4/1998 | Itoh et al. ............. 210/644 |
| 5,811,387 | A | 9/1998 | Simon et al. ........... 514/2 |

(Continued)

FOREIGN PATENT DOCUMENTS

EP    0 382 439    8/1990

(Continued)

OTHER PUBLICATIONS

Greene, Theodora W., "Protective Groups In Organic Synthesis", 3rd Edition, John Wiley & Sons, Inc., New York, (1991), pp. 603-607.

(Continued)

*Primary Examiner*—Krishnan S. Menon
(74) *Attorney, Agent, or Firm*—Viksnins Harris & Padys PLLP

(57) ABSTRACT

Semi-permeable membranes are described that allow for the efficient processing of many liquid based feed solutions, particularly those that contain acids. The membranes of this invention are able to process such feeds with high permeate rates while maintaining excellent retention of dissolved metals, cations, and organic compounds, even in the presence of hot concentrated acids. The semi-permeable membranes of this invention are able to conduct such separations for a useful period of time due to their chemical stability towards acids and their ability to permeate acids.

6 Claims, No Drawings

U.S. PATENT DOCUMENTS

| | | | |
|---|---|---|---|
| 5,843,351 A | 12/1998 | Hirose et al. | 264/45.1 |
| 5,945,000 A | 8/1999 | Skidmore et al. | 210/650 |
| 6,024,873 A | 2/2000 | Hirose et al. | 210/500.38 |
| 6,086,764 A * | 7/2000 | Linder et al. | 210/500.21 |
| 6,103,865 A | 8/2000 | Bae et al. | 528/373 |
| 6,759,441 B1 * | 7/2004 | Kerres et al. | 521/27 |

FOREIGN PATENT DOCUMENTS

| | | |
|---|---|---|
| EP | 0505502 | 9/1993 |
| EP | 0787525 | 8/1997 |
| EP | 0992277 | 4/2000 |
| EP | 1020218 | 7/2000 |
| EP | 0718029 | 4/2003 |
| GB | 875069 | 8/1961 |
| GB | 875072 | 8/1961 |
| JP | 63-012310 | 1/1988 |

OTHER PUBLICATIONS

Cadotte, J. E., et al., "Advanced Poly(Piperazineamide) Reverse Osmosis Membranes", *Office of Water Research and Technology Report, U.S. Department of the Interior PB80-127574*, Contract No. 14-34-0001-8512,(1979).

Dickson, J. M., et al., "Development of a Coating Technique for the Internal Structure of Polypropylene Microfiltration Membranes", *Journal of Membrane Science*, 148, (1998),25-36.

Evers, Robert C., et al., "Notes: Preparation and Thermal Properties of Some Piperazine Polysulfonamides", *Journal of Polymer Science Part A-1*, 5, (1967), 1797-1801.

IMAI, Yoshio, et al., "Synthesis of Polysulfonamides from Aromatic Disulfonyl Bromides and Diamines", *Journal of Polymer Science, Polymer Chemistry Ed.*, 17, (1979),2929-2933.

Ji, J., "Fabrication of Thin-Film Composite Membranes with Pendant, Photoreactive Diazoketone Functionally", *Journal of Applied Polymer Science*, 64, (1997),2381-2398.

Ji, J., et al., "Mathematical Model for the Formation of Thin-Film Composite Membranes by Interfacial Polymerization: Porous and Dense Films", *Macromolecules*, 33, (2000),624-633.

Jiang, Ji M., "Fabrication of Photochemical Surface Modification of Photoreactive Thin-Film Composite Membranes and Model Development For Thin Film Formation by Interfacial Polymerization", *McMaster University*, UMI Dissertation Services,(1996).

Morgan, Paul, "VII. Polysulfonamides and Polyphosphonamides", *In: Condensation Polymers*, Interscience Publishers: New York City,(1965),304-324.

Stake, A. M., et al., "Preparation of Reverse-Osmosis Membranes by Surface Modification of Polymeric Films", *In: NTIS U.S. Department of Commerce Report PB208790*, Contract No. 14-30-2750, Progress Report No. 768,(Apr. 1972).

Sundet, S. A., et al., "Interfacial Polycondensation. IX. Polysulfonamides", *Journal of Polymer Science*, XL, (1959),389-397.

Trushinski, B. J., et al., "Photochemically Modified Thin-Film Composite Membranes. II. Bromoethyl Ester, Dioxolan, and Hydroxyethyl Ester Membranes", *Journal of Applied Polymer Science*, 54, (1994),1233-1242.

Trushinski, B. J., et al., "Photochemically Modified Thin-Film Composite Membranes. I. Acid and Ester Membranes", *Journal of Applied Polymer Science*, 48, (1993),187-198.

Trushinski, B. J., "Polysulfonanide Thin-Film Composite Reverse Osmosis Membranes", *Journal of Membrane Science*, 143, (1998),181-188.

Samantha Platt et al., Stabillity of NF membranes under extreme acidic conditions, Journal of Membrane Science 239 (2004) 91-103.

Jukka Tanninen et al., Long-term acid resistance and selectivity of NF membranes in very acidic conditions, Journal of Membrane Science 240 (2004) 11-18.

V. Freger, Characterization of novel acid-stable NF membranes before and after exposure to acid using ATR-FTIR, TEM and AFM, Journal of Membrane Science 256 (2005) 134-142.

Chan, Wing-Hong, et al., "Water-alcohol separation by pervaporation through chemically modified poly(amidesulfonamide)s", *Journal of Membrane Science*, vol. 160,(1999),77-86.

* cited by examiner

ACID STABLE MEMBRANES FOR NANOFILTRATION

PRIORITY OF INVENTION

This application is a continuation under 35 U.S.C. 111(a) of International Application No. PCT/US01/16901 filed May 23, 2001 and published as WO 01/89654 A2 on Nov. 29, 2001, which claims priority from U.S. Provisional Application No. 60/206,276, which was filed on 23 May 2000; and from U.S. Provisional Application No. 60/206,494, which was filed on 23 May 2000, which applications and publication are incorporated herein by reference.

BACKGROUND OF THE INVENTION

Semi-permeable membranes have a long history of use in separating components of a solution. Such membranes are a type of filter able to retain certain substances while transmitting others. The components of the feed fluid that pass through the membrane are the "permeate" and those that do not pass through the membrane (i.e., are rejected by the membrane or are held by the membrane) are the "retentate". In practice, the permeate, the retentate, or both streams may represent the desired product and may be used as obtained or may be subjected to further processing. In order to be economically viable, the membrane must provide sufficient flux (the rate of permeate flow per unit of membrane area) and separation (the ability of the membrane to retain certain components while transmitting others).

The degree of separation and permeate flux obtained in a membrane process are determined in large part by the general morphology of the membrane together with its physio-chemistry. Utilizing established membrane formation techniques, a given polymer type can be used to fabricate a wide variety of membranes including those with relatively large pores (e.g., microfiltration), those with smaller pores (e.g., ultrafiltration), or even those with pores sufficiently small that solute transport through the membrane is governed by the interactions among specific chemical functional groups in the membrane polymer and the feed components (e.g., nanofiltration (NF), reverse osmosis (RO), gas separation, pervaporation).

Semi-permeable membranes can be described by several different classifications. One method of classifying liquid permeating membranes is to represent them as microfiltration (MF), ultrafiltration (UF), nanofiltration (NF), or reverse osmosis (RO). These classes are not based on any single exact, formal definition, but are used in general terms in the membrane industry.

Microfiltration membranes are those membranes with pores greater than about 0.1 microns. The upper pore size limitation of the microfiltration membranes is not well defined, but can be considered to be about 10 microns. Materials with pore sizes larger than about 10 microns are generally not referred to as membranes. Microfiltration membranes are commonly used to retain small particulates and microbes. Typically, these membranes permeate smaller components, such as, simple salts and dissolved organic materials having a molecular weight of less than about 100,000 grams per mole. Microfiltration membranes usually possess the highest water permeability of the four classes of membranes, due to their large pore diameters as well as their typical high pore density. The pure water permeability (A value) of these membranes is commonly greater than about 5,000.

Ultrafiltration membranes typically are characterized by pore sizes of from about 0.1 micron to about 1 nanometer. Ultrafiltration membranes are commonly classified by their ability to retain specific sized components dissolved in a solution. This is referred to as the molecular weight cut-off (MWCO). Ultrafiltration membranes are commonly used to retain proteins, starches, and other relatively large dissolved materials while permeating simple salts and smaller dissolved organic compounds. The water permeability of ultrafiltration membranes is commonly in the range of from about $A=100$ to about $A=5000$.

Nanofiltration membranes typically are defined as membranes which possess the ability to fractionate small compounds (i.e., those with molecular weights less than 1000). The small compounds are often salts, and nanofiltration membranes are commonly used to permeate monovalent ions while retaining divalent ions. Nanofiltration membranes typically posses ionized or ionizable groups. Although not wishing to be bound by theory, it is believed that the nanofilters can affect the separation of ionic materials through a charge-based interaction mechanism. Nanofiltration membranes also can be used to separate uncharged organic compounds, sometimes in solvents other than water. The water permeability of nanofiltration membranes is commonly in the range of from about $A=5$ to about $A=50$.

Reverse osmosis membranes can retain all components other than the permeating solvent (usually water). Like nanofiltration membranes, reverse osmosis membranes can contain ionic functional groups. Reverse osmosis membranes are commonly used to remove salt from water and concentrate small organic compounds. The water permeability of reverse osmosis membranes is commonly in the range of from about $A=2$ to about $A=20$.

Although the mechanisms that govern membrane performance are not exactly defined, some basic theories have been postulated. A good review of some membrane transport theories can be found in, *The Solution Diffusion Model: A Review*, J. G. Wijmans, R. W. Baker, Journal of Membrane Science, 1995, vol 107, pages 1–21.

It is generally believed that microfiltration and ultrafiltration operate via a pore flow model where the pores of the membrane sieve the components of the feed solution through primarily physical interaction. Chemical interactions between the chemical functional groups on the pore wall and the chemical functional groups of the feed solutions are believed to often play only a minor role in governing separation by microfiltration and ultrafiltration membranes.

In nanofiltration and reverse osmosis membranes, the general belief is that these membranes affect separation through both physical and chemical interactions. Since the pore sizes of these membranes are so small, thought by some to be simply the void space between atoms or chains of atoms, large particles are retained by these membranes because they are physically too large to pass through the membranes. The transport of small components is thought to be governed in part by size-based sieving, as with MF and UF membranes, but also is influenced by interactions between the membrane material and the solute. An NF membrane having an abundance of negatively charged functional groups, for example, will tend to preferentially retain multivalent anions over multivalent cations due to charge repulsion (while maintaining charge neutrality). A membrane with a net positive charge will tend to retain multivalent cations over multivalent anions.

Membranes have also been used in other applications such as pervaporation and gas separation. Typically, in these applications, the membranes permeate gaseous and not liquid materials. Some membranes used in reverse osmosis and nanofiltration have been found to function suitably in pervaporation and gas separation.

In addition, semi-permeable membranes also can be classified by their structure. Examples are symmetric, asymmetric, and composite membranes. Symmetric membranes are characterized by having a homogeneous pore structure throughout the membrane material. Examples of symmetric membranes are some microfiltration membranes, many ceramic membranes, and track-etched microporous membranes.

Asymmetric membranes are characterized by a heterogeneous pore structure throughout the membrane material. These membranes usually posses a thin "skin" layer having a smaller pore structure than the underlying material. Most commercially available ultrafiltration membranes posses an asymmetric structure.

Composite membranes are defined as having at least one thin film (matrix) layered on a porous support membrane. The porous support membrane is commonly a polymeric ultrafiltration or microfiltration membrane. The thin film is usually a polymer of a thickness of less than about 1 micron.

While many types of separations involving a wide range of feed solutions have been made possible through the use of semi-permeable membranes, some feed solutions contain substances that cause the degradation of the membrane or membrane performance and render the membranes impractical for separation of these feed solutions. A decline in performance can be caused by alterations in the morphology and/or the physio-chemical integrity of the membrane. For example, a feed solution can include substances that interact with membrane components to plasticize, dissolve or react with them chemically thus degrading their structure and/or function. Generally, solvents are examples of substances that can plasticize or dissolve membrane components. Examples of substances that may degrade membrane components include acids, bases, oxidants and the like.

The chemical mechanism of action of acids on various chemical functional groups is well known. Although not wishing to be bound by theory, it is believed that the most useful definitions and descriptions of an acid are those referred to as a Lewis acid or a Bronstead acid. A Lewis acid is a compound that is capable of accepting electrons. The more colloquial usage of the term "acid" is that of a Bronstead acid, compounds that can donate protons. Bronsted acids all exhibit Lewis acidity because the proton of a Bronstead acid is capable of accepting electrons. Examples of Bronstead acids include acids such as, for example, sulfuric acid, phosphoric acid, nitric acid, hydrochloric acid, and acetic acid. Similarly, examples of Lewis acids include boron trifluoride, aluminum trichloride, and iron trichloride.

Both Lewis and Bronstead acids are capable of promoting polymer degradations. In aqueous media, this process is often referred to as acid hydrolysis.

When acids attack the polymers of a semi-permeable membrane, the degradation often is observed as an increase in permeate flow through the membrane, a decrease in solute rejection by the membrane, or a combination of a changes in both of these performance properties. Significant changes in either of these properties can make the use of a membrane for separation impractical. Commonly, this type of performance degradation is observed when commercial polyamide nanofiltration (NF) and reverse osmosis (RO) membranes are utilized to process strongly acidic feeds. Although initially their performance may be sufficient to perform the desired separation, the performance rapidly deteriorates, i.e., the membranes lose the ability to retain dissolved metals, such as, cations and/or organic compounds in a short period of time.

Polymeric membranes with stability toward acids are known. Examples of polymers that are relatively stable towards acids and can be used to prepare membranes include polyolefins such as, for example, polyethylene and polypropylene, polyvinylidene flouride, polysulfones, polyethersulfone, and polyether ketones. However, when these polymers are used in a dense film capable of retaining a high degree of dissolved metal cations, and organic compounds, they are unable to permeate acids effectively. Conversely, when these polymers are used to form more porous, less dense morphologies, the resulting polymeric membranes can transmit a high degree of the dissolved acids, but then the membranes are unable to effectively separate dissolved metal cations and organic compounds. Although not wishing to be bound by a theory or mechanism, it is believed that the ineffectiveness of these polymeric membranes is due to the general lack of suitable chemical functional groups which act in a discriminating fashion toward the transport of one feed chemical species as compared with another.

Controlling the deleterious action of acids on semi-permeable membranes is of particular interest because of the numerous acid containing feeds (acid feeds) which otherwise could be treated by membrane filtration. As a result of their ability to dissolve, degrade, and render compounds soluble, acids are often the chemical of choice for various extractions, cleaning processes, and numerous other applications.

Conventional technology available for treatment of acid feeds is inefficient due to the loss of valuable extracted components as well as to the costs associated with environmental waste treatment and disposal of contaminated acids. In addition, there is a continuing need for separation media and/or techniques that, among other things, allow efficient recovery of valuable components from acid feed streams and/or recovery of acids for recycle use.

There is a lack of semi-permeable membranes capable of removing dissolved metal cations, and organic compounds from liquid-based feed streams while possessing exceptional stability and permeability to acids. In one aspect, the present invention provides membranes suitable for such uses.

SUMMARY OF THE INVENTION

It has been found that by incorporating suitable functional groups into acid stable polymers, and by using these polymers in suitable semipermeable membrane morphologies, membranes capable of high permeate rates, and excellent rejection of dissolved metal cations, and organic compounds, can be made which are stable to acidic conditions.

The present invention provides polymeric membranes which are acid stable. In particular, the invention provides acid stable nanofiltration membrane. More specifically, the present invention is directed to the following developments:

1. a nanofiltration membrane which is of a symmetric, asymmetric, or composite morphology,
2. a nanofiltration membrane which is of a symmetric, asymmetric, or composite morphology;
3. a nanofiltration membrane comprising a polymer matrix on a porous or microporous support material;
4. use of a nanofiltration membrane of the invention to separate components of a fluid mixture;
5. a process for separation of such fluid mixtures;

6. a nanofiltration membrane that is capable of performing solution separations under low pH conditions or corrosive conditions; and 7. an apparatus or device including the nanofiltration membrane.

Typically, the nanofiltration membranes of the invention, can transmit at least 85% of the sulfuric acid at a flux of at least 1 gfd from a stream of 9.5% $CuSO_4$, 20% sulfuric acid at 45° C. and 600 psi applied pressure. In addition, the membranes are able to retain at least 50% of the copper. A 20% sulfuric acid solution mainly includes monovalent ions ($H^+$ and $HSO_4^-$), and the ability of the membrane to retain the divalent copper ion while transmitting the essentially monovalent sulfuric acid represents some nanofiltration membrane properties disclosed herein.

A preferred nanofiltration membrane of the invention is a nanofiltration polymer matrix and a support wherein the polymer matrix has an acid stable chemical backbone having cationic groups and is capable of meeting the test described above and maintaining its usefulness. The preferred nanofiltration membranes are polymer matrices on a suitable support. Non-limiting examples of suitable polymer matrices include polymers such as, polyolefins, polysulfones, polyethers, polysulfonamides, polyamines, polysulfides, melamine polymers and the like. A preferred matrix is a sulfonamide polymer matrix derived from sulfonyl monomer residues having at least two sulfonyl groups and amine monomer residues having at least two amine groups.

Polymers typically are identified by the chemical functional groups that are formed, or are used to form, the resulting polymer backbone. Polyamides, for example, are termed as such because those polymers typically are formed through amide bond formation. The fact that such polyamide polymers may have only a small amount of backbone that comprises amide linkages is not respected in the designation of this class of polymers. Therefore, it is not only the atoms and bonds that are involved in the making (and naming) of the polymer that control the properties of the polymer. Rather, it is the sum total of all the atoms and bonds in a polymer that are responsible for the performance of a given polymer.

Sulfonamide polymers include sulfonyl compound residues having at least two sulfonyl moieties and amine compound residues having at least two amine moieties wherein the sulfonyl and amine moieties form at least some sulfonamide groups. The sulfonamide polymer contains at least some sulfonamide linkages in the backbone of the polymer. Other functional and/or nonfunctional linkages such as amide, ester, ether, amine, urethane, urea, sulfone, carbonate, and carbon-carbon sigma bonds derived from olefins may also optionally be present in the backbone. The preferable backbone linkages are sulfonamide linkages, optionally also containing amide, amine, ether and/or sulfone linkages. Especially preferably, a sulfonamide linkage backbone with one or more of the optional linkages is stable to low pH conditions. Also, the amount of optional linkages that are not acid stable is preferably no more than about 10 percent, especially about 5 percent of the number of sulfonamide linkages present in the sulfonamide polymer backbone. Also preferably, the polymer is formed interfacially.

Preferably, the polymer may be at least partially cross-linked. Preferably, the cross-linking is achieved though inclusion of groups on the monomers or reagents that react with the monomers to cause additional linkages between the polymer chains.

In composite membranes, the polymer matrix preferably has a density of from about 0.5 g. per cc to about 2.0 g. per cc, more preferably a density of from about 0.7 g/cc to about 1.7 g/cc, most preferably a density of from about 0.8 to about 1.6 g/cc. The mass to area ratio of the polymer matrix preferably is from about 20 to about 200 mg per meter squared, more preferably from about 30 to about 150 mg per meter squared.

The membranes of this invention can be prepared by proper choice of monomers (or functional polymers) to provide the acid stable polymers and membrane morphology. A membrane suitable for practicing the present invention is one that is able to act effectively as an ion separation membrane after being subjected to 20% sulfuric acid for 24 hours at 90° C. or 20% sulfuric acid for 30 days at 40° C. In a preferred embodiment, the membranes are capable of removing at least 50% of the copper ions at a flux greater than 1 gfd from a feed solution of 9.5% $Cu\ SO_4$ and 20% sulfuric acid when the feed solution is applied to the membrane at an applied feed pressure of 600 psig and a temperature of 25° C.

A preferred embodiment of such a membrane is a thin film composite polysulfonamide. In a more preferred embodiment, the polysulfonamide membrane contains potentially cationic functional groups in order to improve the cationic separation properties of the membrane. One method to prepare such a polymer and morphology is through the interfacial condensation of a multifunctional sulfonyl halide, and a multifunctional amine on a porous support layer. When using interfacial condensation to prepare the membrane, potentially cationic groups can be incorporated into the polymer by their inclusion in one or both of the monomers. Such membranes exhibit excellent stability toward acids and retention of dissolved metals, cations, and organic compounds while permeating acid at high rates.

There are two general routes commonly used by the industry to prepare composite membranes. Both methods comprise first forming a support membrane and secondly forming the thin film on the support membranes. The two general methods are termed interfacial preparation and solution deposition. There are many other methods that can be used. The conditions required for preparation of suitable membranes can be readily determined by one skilled in the art by routine procedures.

Definitions

Unless stated otherwise, the following definitions apply.

The term "cationic functional groups" includes functional groups which are cationic at virtually all pH values (e.g. quaternary amines) as well as those that can become cationic under acidic conditions or can become cationic through chemical conversion (potentially cationic groups, such as primary and secondary amines or amides).

The term "matrix" means a regular, irregular and/or random arrangement of polymer molecules such that on a macromolecular scale the arrangements of molecules may show repeating patterns, or may show series of patterns that sometimes repeat and sometimes display irregularities, or may show no pattern respectively. The molecules may or may not be cross-linked. On a scale such as would be obtained from SEM, X-Ray or FTNMR, the molecular arrangement may show a physical configuration in three dimensions like those of networks, meshes, arrays, frameworks, scaffoldings, three dimensional nets or three dimensional entanglements of molecules. The matrix is usually non-self supporting, and has an average thickness from about 5 nm to about 600 nm, preferably about 5 to about 400 nm. In usual practice, the matrix is grossly configured as an ultrathin film or sheet.

The term "membrane" means a semipermeable material which can be used to separate components of a feed fluid into a permeate that passes through the material and a retentate that is rejected or retained by the material.

The term "monomer" or "monomeric" means a compound that has no branched or unbranched repeating units (e.g. ethylenediamine, 1,3-metaphenylenediamine).

The term "oligomer" or "oligomeric" means a compound that has 10 or fewer branched or unbranched repeating units (e.g. polyethyleneimine with 7 repeating units, tris(2-aminoethyl)amine).

The term "polymer" or "polymeric", when referring to a reactant, means a compound that has 11 or greater branched or unbranched repeating units (e.g. 20,000 MW polyethyleneimine).

The term "composite membrane" means a composite of a matrix layered or coated on at least one side of a porous support material.

The term "support material" means any substrate onto which the matrix can be applied. Included are semipermeable membranes especially of the micro- and ultrafiltration kind, fabric, filtration materials as well as others.

The term "20% sulfuric acid" means a solution of deionized water and 20% sulfuric acid by weight. For illustration, "a feed solution consisting of 9.5% $CuSO_4$ and 20% sulfuric acid" can be prepared by combining 20 grams of $H_2SO_4$, 9.5 grams of $CuSO_4$, and 70.5 grams of deionized water.

The term "average thickness" is the average matrix cross-sectional dimension. It means the average distance in cross section from one side of the matrix to the opposite side of the matrix. Since the matrix has surfaces that are at least to some extent uniform, the average thickness is the average distance obtained by measuring the cross-sectional distance between the matrix sides. Techniques such as ion beam analysis, X-ray photoelectron spectroscopy (XPS), and scanning electron microscopy (SEM) can be used to measure this dimension. Because the cross-sectional dimension usually is not precisely the same at all points of the matrix, an average is typically used as an appropriate measurement.

The term "stable" in the context of the present invention when used to characterize the membrane in acid means that substantially all of the membrane remains intact after exposure to a solution of about 20% sulfuric acid for either one day at 90° C. or 30 days at 40° C., preferably very substantially all of the membrane remains intact under these conditions and especially preferably essentially all of the membrane remains intact under these conditions. In this context of acid treatment, the terms "substantially all, very substantially all and essentially all" mean respectively that the membrane maintains at least 90%, at least 95%, at least 99% of its chemical bonds in the polymer backbone after it has been exposed to these conditions. Also, maintaining at least substantially all of the bonds in the polymer backbone in certain membrane situations includes an improvement of the original permeation and retention values of the membrane such that the after-test permeation and retention values may be better than the original values.

The term "acid stable" when referring to a matrix or polymer means in the context of the present invention the polymer backbone is able to sustain useful membrane properties after the test exposure conditions set forth above.

The term "acid stable" when referring to a linkage means that the linkage remains intact after exposure to a solution of about 20% sulfuric acid for either one day at 90° C. or 30 days at 40° C.

The term "A value" in the context of the present invention represents the water permeability of a membrane and is represented by the ratio of cubic centimeters of permeate water over the square centimeters of membrane area times the seconds at the pressure measured in atmospheres. An A value of 1 is essentially $10^{-5}$ $cm^3$ of permeate over the multiplicand of 1 centimeter squared of membrane area times 1 second of performance at a net driving pressure of one atmosphere. In the context of the present invention, A values given herein have the following unit designation: $10^{-5}$ $cm^3/(cm^2.sec.atm.)$ or $10^{-5}$ $cm/(sec.atm)$ at 25° C.

A=permeate volume/(membrane area*time*net driving pressure).

The term "flux" means the rate of flow of permeate through a unit area of membrane. It should be noted that under most circumstances the flux is directly related to the applied trans-membrane pressure, i.e., a membrane can provide a specific flux of permeate at a given pressure. This flux is often given in units of gfd.

The term "transmission value" means the solute concentration in the permeate divided by the average of the solute concentration in the feed and in the concentrate, expressed as a percentage [i.e. transmission value=permeate/((feed+concentrate)/2), expressed as a percentage]. The concentrate is the fluid that flows completely past, but not through, the membrane.

The term "retention value" means 100% minus the transmission value.

The term "recovery value" means the ratio of permeate fluid flow to feed fluid flow, expressed as a percentage.

The flux and retention values are achieved when the membrane is operated in crossflow mode involving a 34-mil mesh spacer commonly used in the art with less than 5% recovery across the membrane sample or when operated with at least a fluid Reynolds number of 1000.

The term "recovery value" means the ratio of permeate fluid flow to feed fluid flow, expressed as a percentage.

The term "gfd" means gallons per $ft^2$ day. This is the flux rate at which permeate flows through the membranes.

It is to be understood that membranes of the invention, if operated at very high recoveries or with poor mixing at the membrane surface could be made to fail the performance tests described herein. In such tests, the concentration of a solute generally retained by the membrane is severely concentrated at the membrane surface, resulting in higher than expected solute passage.

The term "cations" means ionized atoms that have at least a one plus positive charge. The term "multivalent cations" means in the context of the present invention, ionized atoms that have at least a two plus charge; these are typically metal atoms. However, hydrogen and hydronium ions are also considered cations.

The term "net driving pressure" is equal to the average trans-membrane pressure minus the osmotic pressure difference between the feed and permeate.

The term "removing" means providing a retention value at the specified feed composition and operational conditions. Thus removing "removing at least 50% of the copper ions" means "providing at least 50% retention value of the copper ions".

The term "continuous spaces" means pores, void spaces, or free volume areas where the solutes can pass. These spaces can allow feed solution to pass the membrane without significant retention of the desired solutes.

The term "polysulfonamide" means a polymer comprising sulfonamide linkages in the polymer backbone. The term also includes polymers comprising sulfonamide linkages and other acid stable linkages in the polymer backbone. For example, a polysulfonamide can be prepared through the interfacial reaction of an amine monomer comprising two or more primary or secondary amine groups and a sulfonyl monomer comprising two or more sulfonyl halides.

The term "aliphatic" or "aliphatic group" is known in the art and includes branched or unbranched carbon chains which are fully saturated or which comprise one or more (e.g. 1, 2, 3, or 4) double or triple bonds in the chain. Typically, the chains comprise from 1 to about 30 carbon atoms. Preferably, the chains comprise from 1 to about 20 carbon atoms, and more preferably, from 1 to about 10 carbon atoms. Representative examples include methyl, ethyl, propyl, isopropyl, pentyl, hexyl, propenyl, butenyl, pentenyl, propynyl, butynyl, pentynyl, hexadienyl, and the like.

The term "aryl" denotes a phenyl radical or an ortho-fused bicyclic carbocyclic radical having about nine to ten ring atoms in which at least one ring is aromatic. Representative examples include phenyl, indenyl, naphthyl, and the like.

The term "heteroaryl" denotes a group attached via a ring carbon of a monocyclic aromatic ring containing five or six ring atoms consisting of carbon and one to four heteroatoms each selected from the group consisting of non-peroxide oxygen, sulfur, and N(X) wherein X is absent or is H, O, $(C_1-C_4)$alkyl, phenyl or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto. Representative examples include furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) quinolyl (or its N-oxide), and the like.

The term "heteroaliphatic" or "heteroaliphatic group" is known in the art and includes branched or unbranched carbon chains wherein the chain is interrupted with one or more (e.g. 1, 2, 3, or 4) non-peroxy oxygen, sulfur or nitrogen atoms. Typically, the chains comprise from 1 to about 30 carbon atoms and from about 1 to about 10 heteroatoms. Preferably, the chains comprise from 1 to about 20 carbon atoms and from about 1 to about 10 heteroatoms; and more preferably, from 1 to about 10 carbon atoms and from about 1 to about 5 eteroatoms. Representative examples include 2-methoxyethyl, 3-methoxypropyl, and the like.

The term "membrane is cationic" means that the membrane carries a net positive charge. This can be measured, for example, by streaming potential.

DETAILED DESCRIPTION OF THE INVENTION

Although the composition, use, method of separating solutes, and method of making the semipermeable membrane of the present invention are not limited provided the above-mentioned performance properties of the membrane can be obtained, there are certain structural properties that can be expected to yield preferred membranes.

The nanofiltration membranes of the invention, after exposure to an acid solution consisting of 20% sulfuric acid for either, 24 hours at 90° C. or 30 days at 40° C., are capable of meeting the test of removing at least 50% of the copper ions from a feed solution consisting of 9.5% $CuSO_4$ and 20% sulfuric acid at a flux of at least 1 gfd, wherein the feed solution is applied to the membrane at a pressure of 600 psig and a temperature of 25° C.

Preferably the nanofiltration membrane can meet this test when the flux is at least 2 gfd and wherein at least 80% of the copper ions from the feed solution are removed. The nanofiltration membranes of the invention can pass at least 85% of the sulfuric acid in a 20% aqueous $H_2SO_4$ solution (for example at 600 psi and 25° C.).

In order to permeate a fluid, there should exist a plurality of pores, void spaces, or free volumes within the membrane which can act as conduits through which the fluid permeates. Such conduits may exist permanently within the film, or may exist transiently as with polymer dynamic fluctuations. They may be continuously connected, or they may be temporarily connected as a consequence of the random movements of the various polymer chains in the membrane. Both the size and number of these free volume regions impact the permeability of a membrane, with an increase in either leading to higher permeability. The size of these free volume regions is, however, limited by the need to retain solutes such as dissolved metal ions, cations, or organic compounds.

Typically, to prevent the membrane from transmitting solutes, the membrane should not contain a high degree of continuous spaces, i.e., pores, void spaces, or free volume areas where the solutes can pass without significant restriction. Large void spaces can allow feed solution to pass the membrane without significant retention of the desired solutes. In practice, such voids present in RO and NF membranes are often referred to as defects. The presence of defects does not remove an acceptable membrane from the purview of this invention, as long as there are sufficiently few to allow the membrane to meet the specified performance criteria.

The thickness of the separating layer will also impact performance. Generally, a thicker separating layer offers greater resistance toward flow and, thus, will require a higher driving force to produce a flow similar to that of a thinner membrane. For this reason, it is preferred that the thickness of the separating layer of these membranes should be less than about 5 microns, more preferably less than about 3 microns and most preferably less than about 1 micron. However, a common feature of thin films is their increased tendency to exhibit defects with decreasing thickness. These defects can arise from a variety of factors singly or in combination, but as a general principle they are associated with the relative loss in mechanical integrity as the film becomes progressively thinner. For example, the mechanical integrity of such a film is compromised, increasing the chance that applied pressures may violate the integrity of the film. For these reasons separating layers are preferred to be thicker than at least about 0.005 microns, and more preferably thicker than about 0.02 microns.

As a means to increase the mechanical strength of the thin film, and/or to minimize or control swelling, it is often desirable to cross-link the separating layer. The amount of cross-linking required and the amount of cross-linking agent needed to stabilize the polymer film depends on the nature of the polymer, including its polarity, degree of interaction with the feed solution, molecular weight, chain stiffness, and crystallinity. The specific degree of cross-linking can vary widely, but commonly is greater than 1 cross-link per 100 polymeric repeat units.

In order to maintain the mechanical integrity of a thin film composite membrane while in the presence of significant pressure differentials, it is common practice to provide a thicker porous membrane to act as a support for the thin film.

Typically, these support materials are 25 to 100 microns thick, although the actual thickness is not critical, provided that it imparts the necessary mechanical support at the required operating pressures.

The supporting layer should provide minimal resistance to flux relative to that of the thin film. Suitable supports are often found in ultra- or micro-filtration membranes. These membranes have both good mechanical integrity and a nominal resistance to flow relative to the thin films. Such supporting membranes are well known and can be prepared by numerous techniques such as phase inversion and track etching, among others.

The material constituting the semipermeable support is relatively unimportant so long as it is stable to the feed solution, pressure, and temperature, and so long as it is compatible with the thin film. Non limiting examples of such materials include polysulfone, polyethersulfone, polyvinylidene fluoride, polyvinylchloride, ceramics, or porous glass.

Several techniques exist to prepare the thin, supported films useful in practicing the invention. If the separating layer is made of the same material as the supporting membrane, the membrane can be made by phase inversion. In this technique, the polymer is dissolved along with additives meant to affect morphology in a first solvent. The polymer solution is then metered to the proper thickness on the support, often a woven fabric. Then the membrane is formed by phase inversion by immersing the support and the polymer solution into a second solvent which is miscible with the first, but in which the polymer is insoluble. Proper choice of both the first and second solvent, additives, and the polymer concentration, can be used to alter the morphology. Commonly, the resulting membrane has an asymmetric, porous morphology with an uppermost, thin separating layer and a more porous supporting layer. Secondary treatments, such as heat or chemical modification, also may be used to tighten the separating layer, or modify its stability and/or transport characteristics.

A preferred method is to form the thin film separating layer in a separate manufacturing step. This method allows the support membrane properties, and the film chemistry and morphology to be optimized separately for their disparate functions. One such method is deposition. In this method, a suitable separating layer polymer or prepolymer is dissolved in a volatile solvent which does not dissolve, plasticize, or in other ways damage the supporting membrane. Additives meant to react with, modify, or cross-link the separating layer, as well as those meant to affect the film morphology are also added. The solution is then applied to the supporting membrane, metered to the desired thickness, and then subjected to conditions meant to remove the solvent. For this purpose heat is often used as it is often capable of both removing the solvent and driving reactions meant to cross-link, modify, or react with the film. The thickness of such films can be controlled both by the metered solution thickness, and by the concentration of polymer and/or prepolymer in the solution. See J E Cadotte, et al; MRI—North Star Division research report to the Office of Water Research and Technology, Department of the Interior, March 1978.

Another preferred method is through the process of interfacial synthesis. During interfacial synthesis, two or more reactants, dissolved in separate miscible or immiscible solvents are brought into contact. Typically, the reaction occurs near the interface of the two solvents where diffusion from one phase to the other is occurring. The reaction at this interface results in the formation of a thin polymeric membrane, which, when formed, separates the reactants and prevents further film growth. This self-limiting reaction provides a simple route to thin membranes with relatively few defects.

The choice in solvent pairs is fairly broad. It is preferred that the solvents are immiscible. For practicality, it is often preferred that one of the solvents is water. The second phase typically comprises an organic solvent. Organic solvents suitable for practicing the present invention include solvents such as, alkanes such as , for example, hexane, cyclohexane, heptane, octane, and the like; paraffins or isoparaffins such as, for example, Isopar E, Isopar G, VM&P naphtha, and the like; or chlorinated solvents such as, for example, chloroform, methylene chloride, dichloroethylene and the like. In either phase, co-solvents may be used to increase the solubility of the reactant.

Depending on the rate of the film forming reaction, the inclusion of catalysts may be used to improve film performance. Monomers with relatively slow formation rates can often benefit from nucleophilic catalysts. Pyridine based catalysts such as, for example, dimethylaminopropyl dine, 4-(4-methyl-1-piperidinyl)-pyridine and the like are particularly preferred. Other suitable catalysts are disclosed in U.S. Pat. No. 5,693,227.

After providing sufficient time for the membrane to form, the solvents are removed. This can be accomplished by several means, the most common being evaporation or heating. In order to prevent loss of flow due to the application of heat, compounds such as amine salts, glycerin, glycols, and the like are often added to the membrane before heating. This can be accomplished either by the addition of the compound to one of the two immiscible solvents, or by an application of the compound to the membrane after it is formed. After the solvents have been removed, the membrane is ready for use, although if desired it may be further processed to remove residual chemicals (such as starting materials), adjust performance, or to apply a protective coating.

In addition to film morphology, the choice of polymers for membranes can have a large impact on performance. A preferred polymer is a polysulfonamide. Applicant has discovered that sulfonamide membranes are surprisingly stable to acidic conditions compared to commonly used membrane materials. This stability could not have been predicted based on the known stability of the sulfonamide bond. Thus, polymers comprising sulfonamide linkages in the polymer backbone are particularly useful for preparing the acid stable membranes of the invention. Additionally, polymers comprising sulfonamide linkages and other acid stable linkages in the polymer backbone are also particularly useful for preparing the acid stable membranes of the invention. Sulfonamide membranes are also preferred due to their ability to be formed in the appropriate morphology through the interfacial reaction of a multifunctional amine, and a multifunctional sulfonyl halide.

Sulfonamides are also preferred polymers due to their chemical nature, which could be expected to improve their ability to transport polar solvents such as water or acids. However, despite their chemical nature it may be desirable to add additional functional groups to improve retention of multivalent cations and/or improve acid transport. Preferred examples of such functional groups include those possessing a positive charge at pH<3 or more preferred at pH<7. These include, but are not limited to derivatives of ammonium, phosphonium, or sulfonium.

The sulfonamide polymer matrices according to the invention are preferably formed at least in part from compound residues derived from a sulfonyl compound having any organic nucleus and at least two activated sulfonyl groups. The sulfonyl compound may be a monomer, an oligomer, a complex molecule or other organic moiety having at least two activated sulfonyl groups. Preferably, this sulfonyl compound has Formula I:

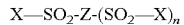

$$X\text{—}SO_2\text{-}Z\text{-}(SO_2\text{—}X)_n \qquad\qquad I$$

wherein Z may be any organic nucleus that does not react with activated sulfonyl groups or with primary amine groups and X is any leaving group appropriate for creation of activated sulfonyl groups. An activated sulfonyl group is a sulfonyl group that will react with a primary or secondary amine group to produce a sulfonamide group. Preferably, Z is an organic nucleus of 1 to about 30 carbon atoms, which optionally may contain oxygen, sulfur and/or nitrogen atoms as substituents or within the nucleus structure itself. The organic nucleus preferably may be aliphatic (i.e., linear or branched alkyl or alkenyl or alkynyl), cycloaliphatic, aryl, arylalkyl, heteroaliphatic, heterocycloaliphatic, heteroaryl or heteroarylalkyl wherein the hetero nucleus contains one or more oxygens, sulfurs or nitrogens. The organic nucleus may be unsubstituted or substituted wherein the substituents are polar, ionic or hydrophobic in nature. Such substituents may include but are not limited to amide, ester, ether, amine, urethane, urea, carbonate and/or thioether groups optionally substituted with aliphatic groups of 1 to 6 carbons. Such substituents may also include but are not limited to halogen, carboxylic acid, sulfonic acid, phosphoric acid, and/or aliphatic groups of 1 to 12 carbons, the latter aliphatic groups optionally being substituted by halogens. The variable "n" may be an integer of from 1 to 3. X may be halogen, azide, a mixed sulfonoxy group (forming an activated sulfonyl anhydride) and the like.

The sulfonamide polymer matrices of the invention preferably may also be formed from amine compound residues derived from an amine compound having any organic nucleus and at least two primary and/or secondary amine groups. The amine compound may be a monomer, an oligomer, a complex molecule or any organic moiety having at least two primary and/or secondary amine groups. Preferably, the amine compound has Formula II:

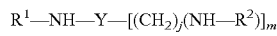

$$R^1\text{—}NH\text{—}Y\text{—}[(CH_2)_j(NH\text{—}R^2)]_m \qquad\qquad II$$

wherein $R^1$ and $R^2$ are independently hydrogen or aliphatic groups of 1 to 30 carbons, Y is any appropriate organic nucleus, preferably of 1 to 30 carbons, and optionally containing one or more oxygen, sulfur or nitrogen atoms. Preferably, Y is an aliphatic, aryl or arylalkyl group of 1 to 30 carbons or is a corresponding heteroaliphatic, heteroaryl or heteroarylalkyl group containing 1 or more oxygen, sulfur or nitrogen atom. The letter m is an integer from 1 to 3 and j is zero or an integer of from 1 to about 10.

An especially preferred sulfonamide polymer matrix of the invention is formed from one or more combinations of the following compound residues: naphthalene disulfonyl residues of any substitution pattern, naphthalene trisulfonyl residues of any substitution pattern, benzene disulfonyl residues of any substitution pattern, benzene trisulfonyl residues of any substitution pattern, pyridine disulfonyl residues of any substitution pattern, alpha, omega diaminoalkanes of 1 to 10 carbons, triethylenetetramine [CAS No. 112-24-3], tetraethylene pentamine, tris(2-aminoethyl) methane, 1,4-bis[3-aminopropyl]piperazine, tris-(2-aminoethyl)amine, and 2-hydroxy-1,3-diaminopropane.

It is important to note that sulfonamide polymers are only one of many polymers that can be used to form membranes useful in practicing this invention. This invention discloses that the interfacial technique, which is used widely in the membrane industry to prepare acid-sensitive polyamide membranes, can be used with sulfonyl halide monomers to prepare acid stable membranes. The resulting membranes are acid stable because the overall bonding network is acid stable and because the overall bonding network provides separation channels that preferentially permeate acids relative to divalent copper.

This invention also provides many polymers that can work as membrane polymers for this separation, provided that the resulting membrane possess the required properties described earlier. Examples of such polymers include polystyrenes, polysulfones, and other aryl-containing polymers. These polymers can be aminated, for example, through first chloromethylation of the aryl ring followed secondly by reaction with an amine. These polymers can then be formed into composite membranes, for example, through the deposition method described earlier. Other polymers which could be useful in this invention include those with potentially cationic functionalities in the backbone of the polymer, such as polyethyleneimine and its derivatives.

The invention also includes the polysulfonamide membrane which is a composite of a sulfonamide polymer matrix located on at least one side of a porous or microporous support material. The porous support material may be composed of any suitable porous material including but not limited to paper, modified cellulose, woven glass fibers, porous or woven sheets of polymeric fibers and other porous support materials made of polysulfone, polyethersulfone, polyacrylonitrile, cellulose ester, polyolefin, polyester, polyurethane, polyamide, polycarbonate, polyether, and polyarylether ketones including such examples as polypropylene, polybenzene sulfone, polyvinylchloride, and polyvinylidenefluoride. Ceramics, including ceramic membranes, glass and metals in porous configurations are also included. The support material typically contains pores have sizes ranging from about 0.001 microns to about 1 micron. The composite membrane may be formed as sheets, hollow tubes, thin films, or flat or spiral membrane filtration devices. The support thickness dimension ranges from about 1 micron to approximately 250 microns.

Specific support materials include polysulfones, polyethersulfones, sulfonated polysulfone, sulfonated polyethersulfone, polyvinylidene fluoride, polytetrafluoroethylene, polyvinyl chloride, polystyrenes, polycarbonates, polyacrylonitriles, polyaramides, nylons, polyamides, polyimides, melamines, thermosetting polymers, polyketones (including polyether ketones and polyetheretherketones), and polyphenylenesulfide, as well as composite membrane versions of these.

Preferably, the support material has an A value greater than 10, more preferably greater than 40, and even more preferably greater than 100. Additionally, the support material preferably has a molecular weight cut off (measured by the ASTM method at 90% dextran rejection) of less than 500,000, more preferably less than 100,000, more preferably less than 30,000, and most preferably less than 20,000.

The polymers useful in practicing the present invention can include functional groups as part of the polymer chain, e.g., a polyamine oligomer, or these groups can be attached as pendant groups. These groups can be incorporated into the polymer by any suitable route. A particularly efficient method is to use a multifunctional monomer with the functionality, or a derivative of the functionality, incorpo rated within the structure. The monomer can be included into either the multifunctional sulfonyl halide, or the multifunctional amine. An interfacially prepared film incorporating such a monomer would have the desired functionality present throughout the membrane matrix.

Non-limiting examples of a functional group that are cationic at all pH ranges are quarternary ammonium groups. Primary, secondary or tertiary ammonium groups are examples of groups that become cationic at certain pH levels. Another type of "cationic functional group" is one which is generated by chemical reaction. An example of a suitable groups are groups such as, for example, amides, which release carboxylic acids leaving ammonium functional groups after hydrolysis. It will be obvious to those skilled in the art that the phrase "potentially cationic" refers simply to chemical functional groups which are cationic or could become cationic based on pH and/or chemical conversion.

It is not a mandate of this invention that the membrane polymer contain an excess of cationic functionality. If the membrane matrix can be prepared with sufficiently designed separation channels, a separation can be attained mainly through size exclusion. However, the preferred membranes also possess potentially cationic groups which assist the separation through charge interactions.

In order to evaluate the long-term stability of the membrane to acids, a suitable method is to use temperature to accelerate degradation. As a reasonable approximation, the rate of many such degradation reactions is doubled with every 10° C. increase in temperature. Thus a thirty day exposure to an acid at 40° C., can be approximated with a 24 hour exposure at 90° C. Of course the high temperature method will not be possible for membranes having heat sensitive polymers, or other membranes where the membrane degradation does not follow the above relationship. In those cases, the lower temperature, longer exposure test is required to gauge acid stability. It is not the intent of this disclosure to exclude such heat sensitive polymers, rather, to provide an acid stable membrane and a test for gauging acid stability.

EXAMPLES

Example 1

A membrane of the invention was prepared in the following manner. An aqueous solution of 60% technical grade triethylenetetramine (1.0% TETA by weight) and dimethylaminopyridine (0.1%) was poured onto the upper surface of a water wet PES/UF support membrane (Osmonics, Inc., Minnetonka Minn.: HW31). This solution was allowed to remain in contact with the support for 1 minute. The excess fluid was drained and metered with an air knife. An organic solution comprising 1,3,6-naphthalenetrisulfonyl chloride (0.16%) and monoglyme (4%) in Isopar G was then poured upon the metered aqueous solution. This organic solution and the aqueous solution were allowed to remain in contact for 1 minute before the excess organic solution was drained and before the remaining organic solvent was allowed to evaporate for 15 minutes.

The HW31 PES/UF support membrane has an A value of about 90–100 and a molecular weight cut off (measured by the ASTM method at 90% dextran rejection) of about 6000–9000 Daltons.

Test Method

The membrane prepared according to the procedure of Example 1 was placed in a 20% sulfuric acid solution at 90° C. for a period of 24 hours. After this exposure, the membrane was removed and its performance was measured using an Osmonics ST test cell. A feed solution (250 mL) at 25° C. comprising sulfuric acid (20%) and copper (II) sulfate (8.8%) was supplied to the membrane at a feed pressure of 600 psi. After 10 mL of fluid had permeated through the membrane, the solvent flux and the $Cu^{2+}$ passage were measured. The membrane was found to have a flux of 6.8 gfd and 93.1% $Cu^{2+}$ retention value.

Example 2

A membrane was prepared according to the procedure of Example 1. The procedure was modified by using tris (2-aminoethyl)amine in place of triethylenetetramine. This membrane was then tested by the method described above and found to have a flux of 2.0 gfd and 90.7% $Cu^{2+}$ retention value.

Example 3

A membrane was prepared according to the procedure of Example 1. The procedure was modified by using 6.6% triethylammonium camphorsulfonate in the aqueous phase, and the membrane was made in a continuous web process. The composite membrane was dried at 250° F. for about 3 minutes.

Example 4

The membrane of Example 3 was rolled into a spiral wound module and tested in a lean electrolyte bleed application (e.g. see U.S. Pat. No. 5,476,591). The membrane was challenged against a feed of 40 G/L $Cu^{2+}$, 130 ppm $Co^{2+}$ in 20% $H_2SO_4$ at 45° C. After 2 days online the $Co^{2+}$ retention value was 82% and the $Cu^{2+}$ retention value was 69% while the sulfuric acid retention value was −7%. These levels of performance were unchanged after 3 weeks online (in service).

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A nanofiltration membrane comprising a polysulfonamide polymer matrix which after exposure to a 20% sulfuric acid solution for either, 24 hours at 90° C. or 30 days at 40° C.; is capable of meeting the test of: removing at least 50% of the copper ions from a feed solution consisting of 9.5% $CuSO_4$ and 20% sulfuric acid at a flux of at least 1 gallon per foot$^2$ per day; wherein the feed solution is applied to the membrane at a pressure of 600 psig and a temperature of 25° C., wherein the nanofiltration membrane is prepared from the reaction of 1) a naphthalene disulfonyl reactant, a naphthalene trisulfonyl reactant, a benzene disulfonyl reactant, or a benzene trisulfonyl reactant, or mixtures thereof; with 2) diethylenetriamine, triethylenetetramine, tetraethylenepentamine, hexaethylenepentamine, or tris-(2-aminoethyl)amine, or mixtures thereof.

2. A membrane according to claim 1 wherein the test flux is at least 6 gallons per foot$^2$ per day.

3. A membrane according to claim 2 wherein the test copper retention value is at least 90%.

4. The membrane according to claim 1, wherein at least 80% of the copper ions from the feed solution are removed.

5. A separation method comprising contacting a membrane according to claim 1 with an acid-containing feed solution having a pH less than about 4 that comprises dissolved cations, wherein the membrane removes at least a portion of the dissolved cations from the feed solution.

6. A method for treating a metal ore sample comprising contacting a membrane according to claim 1 with an acid-containing feed solution comprising a dissolved metal ore; wherein the feed solution comprises metal ions; and wherein the membrane removes at least a portion of the metal ions from the feed solution.

* * * * *